No. 894,315. PATENTED JULY 28, 1908.
D. CONFER.
HAY PRESS.
APPLICATION FILED MAR. 28, 1907.
2 SHEETS—SHEET 1.
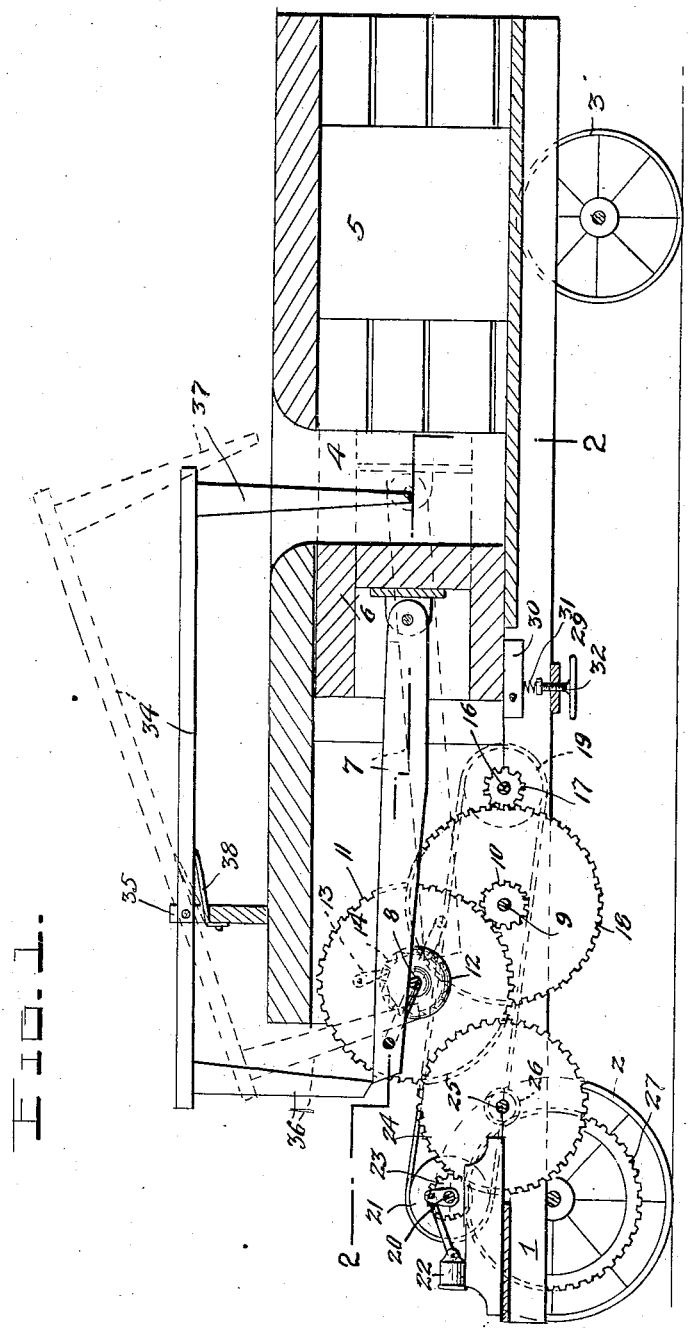
Witnesses
Chas. L. Griesbauer.
C. H. Griesbauer.
Inventor
D. Confer
by H. B. Willson & Co.
Attorneys

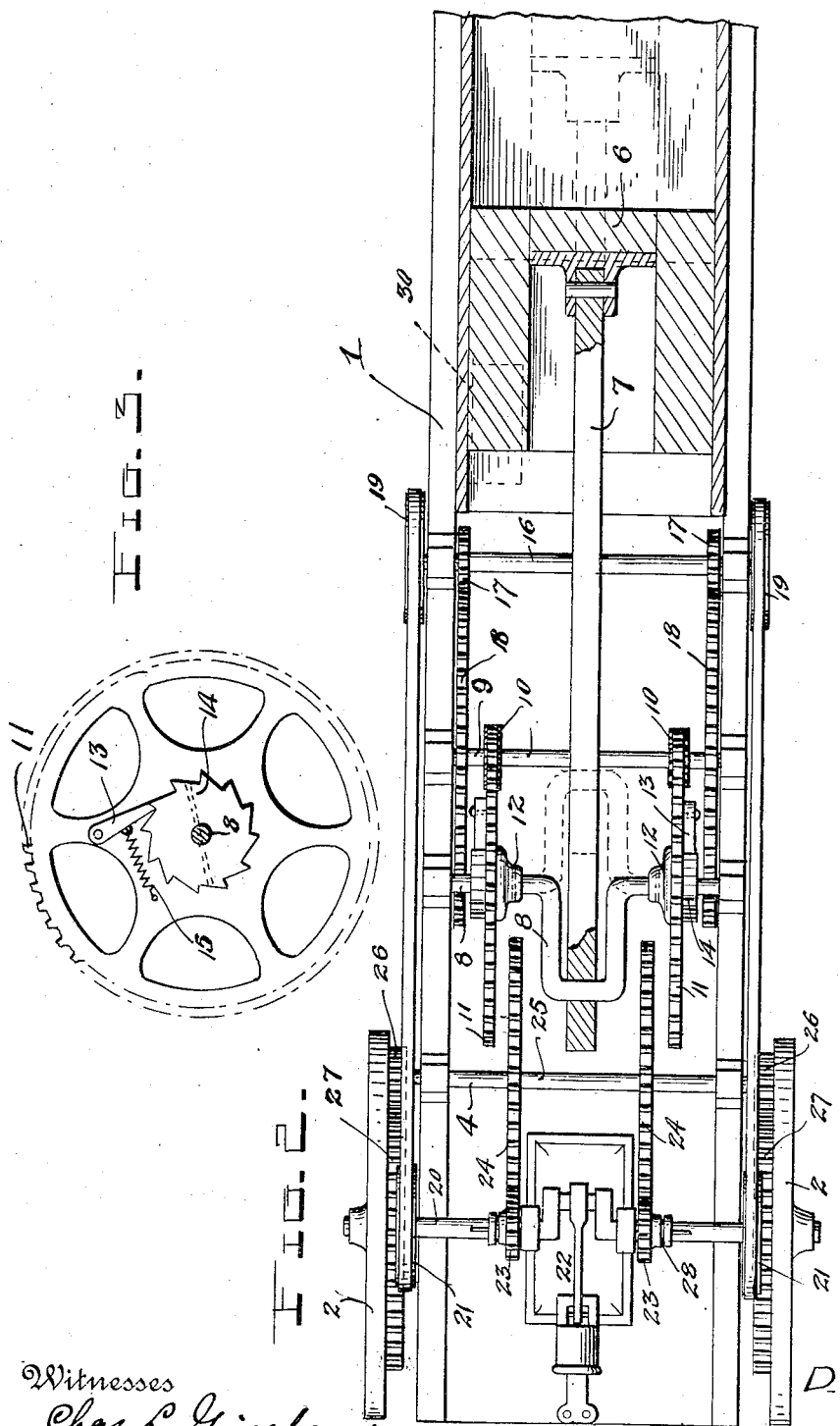

UNITED STATES PATENT OFFICE.

DAVID CONFER, OF CANISTEO, NEW YORK.

HAY-PRESS.

No. 894,315.  Specification of Letters Patent.  Patented July 28, 1908.

Application filed March 28, 1907. Serial No. 365,147.

*To all whom it may concern:*

Be it known that I, DAVID CONFER, a citizen of the United States, residing at Canisteo, in the county of Steuben and State of New York, have invented certain new and useful Improvements in Hay-Presses; and I do declare the following to be a full, clear, and exact description of the invention, such as will enable others skilled in the art to which it appertains to make and use the same.

My invention has relation to new and useful improvements in hay presses, and has for its object the production of a press of this character having improved means for operating the follower and hay feeder and for overcoming the unequal backward recoil and consequent jarring and vibration produced thereby in machines of this character.

My invention is of comparatively simple and economical construction, and is efficient in operation.

In the accompanying drawings in which like parts are designated by like characters throughout the several views:—Figure 1 is a longitudinal sectional view of my improved hay press, the dotted lines showing one of the positions of the hay feeder; Fig. 2 is a plan view of a horizontal section on the line 2—2 of Fig. 1, the dotted lines showing one of the positions of the follower; Fig. 3 is a detail view of one of the gear wheels, pulleys and ratchets used for driving the operating crank shaft.

Referring more particularly to the drawings, the numeral 1 designates the frame of the press, which is mounted near its front and rear ends on suitable truck wheels 2 and 3, respectively, and is provided with a hay pressing chamber 4 and wiring chamber 5. 6 represents the follower which works in said hay pressing chamber 4 and is connected by a pitman 7 to an operating crank shaft 8 journaled in said frame 1 a suitable distance rearward of the front truck wheels 2. 9 represents a driven shaft which is journaled to said frame rearward of said crank shaft 8, and has rigidly fixed near its ends pinions 10, adapted to mesh with drive gears 11, loosely connected to said crank shaft 8 by collars 12 or other suitable means, and provided with pawls 13, adapted to be held in engagement with ratchet wheels 14, fixed to said crank shaft 8 outward of said drive gears 11, by springs 15, each connected at one end to its pawl and at its opposite ends to the adjacent drive gear 11. 16 represents a transverse drive shaft, which is journaled to said frame a suitable distance rearward of said driven shaft 9 and has fixed near its ends drive pinions 17, adapted to mesh with gear wheels 18, fixed to said driven shaft 9, outward of said pinions 10. Said drive shaft 16 is also provided at its extreme ends, preferably without said frame, with pulleys 19, the purpose of which will be disclosed. 20 represents a drive crank shaft, which is journaled in suitable bearings of said frame near its front end, and is provided near its ends, preferably without said frame, with drive pulley 21. Said crank shaft is adapted to be operated by means of a gasolene engine 22 or other equivalent means, mounted on the front end of said frame, and in the operation of my invention power is transmitted from said crank drive shaft 20 to said drive shaft 16 by belts which run over said pulleys 21 and 19. Said crank drive shaft 20 is also provided inward of said drive pulleys 21 with drive pinions 23 adapted to mesh with gears 24 fixed to a transverse shaft 25 journaled in suitable bearings rearward of said crank drive shaft, and having fixed to its extreme ends pinions 26, adapted to mesh with annular gears 27, bolted or otherwise secured to said front truck wheels 2. Said drive pinions 23 are adapted to be thrown into and out of engagement with said gears 24 by clutches 28 on said crank drive shaft 20. Said drive pinions 23 are thrown into engagement with said gears 24 when it is desirous to move the press from one place to another. A brake 29 comprising a brake beam 30, a coiled spring 31 and a regulating screw 32, is secured to the frame of said press, and when in use, said brake beam 30 works against the follower and prevents an unequal backward recoil of the follower, and consequent jarrings of the machine. The brake beam is placed below the follower and lifts it off the floor of the pressing chamber. In this way the wear on the floor of the pressing chamber is reduced to a minimum, as the brake beam receives all, or nearly all of the wear. This is advantageous because the brake beam can be easily adjusted or replaced to compensate for wear and the floor of the pressing chamber cannot. It will be apparent that the backward recoil of the follower may be controlled by said brake.

The numeral 34 represents a hay feeder, which is pivotally connected near its front end to the upper end of a fulcrum post 35 secured in any desirable manner to the frame, or other part of the machine, above said mentioned parts. Said hay feeder is provided near its front end with an engaging arm 36, the lower end of which is adapted to engage the upper edge of said pitman 7, and at its rear end with a feeding arm 37. Said hay feeder is normally held in an oblique position and its feeding arm 37 held out of the pressing chamber 4 by means of a lifting spring 38, attached at one end to said fulcrum post 35 immediately below said hay feeder 34.

In the operation of my invention said gasolene machine is thrown into use and operates to turn said drive shaft 20, which shaft, through the medium of said drive pulleys 21 and 19 on said crank drive shaft 20, and drive shaft 16, and belts, effects the rotation of said drive shaft 16, which shaft, in turn, through the medium of its pinions 17 and gears 18, and pinions 10 of said drive shaft 9, effects the rotation of said gears 11, loosely connected to said operating crank shaft 8 and said gears 11, by means of said pawl 13 and ratchet wheels 14, effect the rotation of said operating crank 8, which crank, through the agency of said pitman 7, drives the follower back and forth in the hay pressing chamber 4. When said follower 6 moves backward said pitman 7 engages the arm 36 of said hay feeder 34 and swings the arm 37 thereof into the hay pressing chamber 4, and as soon as the follower has moved sufficiently forward in the pressing chamber to throw the front end of said pitman out of engagement with the arm 36 of said hay feeder 34, the lifting spring 35 will act to swing the arm 37 out of the pressing chamber 4, in the position as shown by dotted lines in Fig. 1. As before stated, said drive pinions 23 are only thrown into use when it is desirous to move the press from one place to another.

Having described my invention, what I claim as new and desire to secure by Letters-Patent, is:—

1. In a baling press, a pressing chamber, a follower reciprocating therein, an adjustable brake beam adapted to bear against the lower side of said follower to partially support and control the recoil of said follower.

2. In a baling press, a pressing chamber, a follower, means to reciprocate said follower, removable means forming a part of the lower floor of said pressing chamber and adapted to partially support said follower, and adjustable resilient means to support such removable means.

3. In a hay press of the character described the combination of a truck, a frame having a pressing chamber mounted on said truck, a follower working in said pressing chamber, a crank shaft journaled to said frame rearward of the front truck wheels, a pitman connected to said crank and said follower, and a brake comprising a brake beam, a coiled spring, a regulating screw secured to said frame and adapted to control the backward movement of said follower, with means for effecting the rotation of said crank shaft, said brake beam being adapted to press upon the lower side of said follower to partially support the same whereby the wear of the lower part of said follower is received by said brake beam.

4. In a hay press the combination of a truck, a frame having a pressing chamber mounted on said truck, a follower adapted to work in the pressing chamber of said frame, a crank shaft journaled in said frame, a pitman connecting said crank shaft with said follower, a removable brake beam adjustable and resiliently pressed against the under side of said follower to control the backward movement of said follower and to partly support the same, and a hay feeder fulcrumed near its front above said mentioned parts and adapted to be swung in said pressing chamber by said pitman, and a lifting spring adapted to raise said feeder out of the pressing chamber, with means for effecting the rotation of said crank shaft.

In testimony whereof I have hereunto set my hand in presence of two subscribing witnesses.

DAVID CONFER.

Witnesses:
C. C. BURRELL,
H. M. BURRELL.